Feb. 20, 1934.  G. A. HATHERELL ET AL  1,947,848
SYSTEM OF PHOTOGRAPHIC PRINTING
Filed Nov. 19, 1929  2 Sheets-Sheet 1

Inventors
George A. Hatherell,
Thomas M. Ingman,
Frank E. Garbutt.
Attorney.

Feb. 20, 1934.　　G. A. HATHERELL ET AL　　1,947,848
SYSTEM OF PHOTOGRAPHIC PRINTING
Filed Nov. 19, 1929　　2 Sheets-Sheet 2
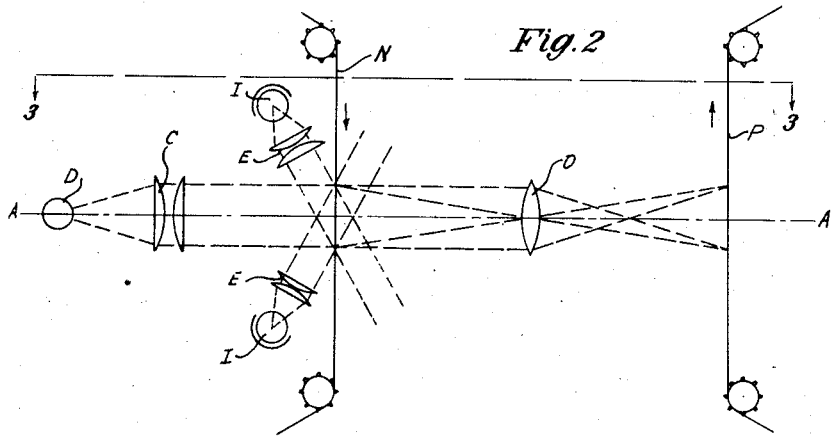
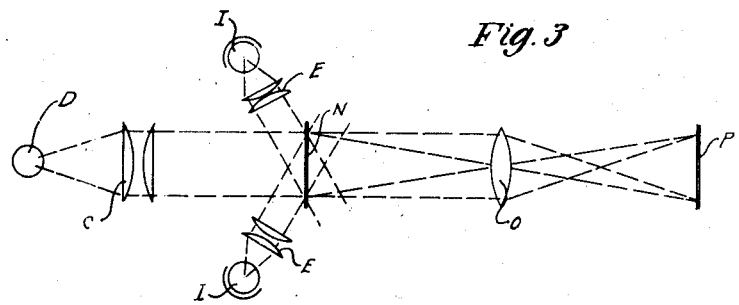
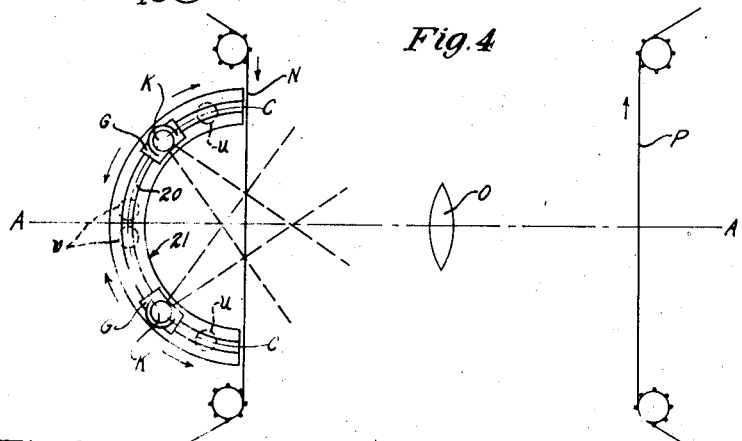
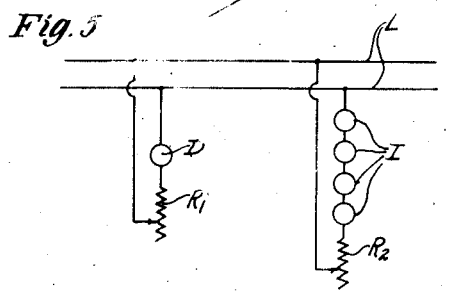
*Inventors*
*George A. Hatherell,*
*Thomas M. Ingman,*
*Frank E. Garbutt.*
*Attorney.*

Patented Feb. 20, 1934

1,947,848

UNITED STATES PATENT OFFICE 1,947,848

SYSTEM OF PHOTOGRAPHIC PRINTING

George A. Hatherell, Roscoe, and Thomas M. Ingman and Frank E. Garbutt, Hollywood, Calif., assignors, by mesne assignments, to Paramount Publix Corporation, Los Angeles, Calif., a corporation of New York Application November 19, 1929
Serial No. 408,234

7 Claims. (Cl. 88—24)

This invention has reference to the art of photographic printing, and is particularly concerned with means for controlling the contrast characteristics of a positive in projection printing. It is well known that positives obtained by projection printing possess more contrast than the negatives from which they are obtained, or than contact prints from the same negatives. Thus it frequently occurs that the negative of a photographic scene is of such a character that although it could be used to produce a contact print of good character, a positive printed therefrom by projection is found to be unacceptably harsh or "contrasty".

A general object of the invention may now be stated to be to reduce and control the contrast of a positive in projection printing.

While the invention has its major value in connection with the printing of motion picture film, and is therefore hereinafter described with that application chiefly in view, the invention is not necessarily limited to motion picture film, as will be readily recognized. And although in the following specification we speak particularly of the printing of a positive from a negative, it will be understood that a negative may be printed from a positive in a similar manner. In the purpose of the appended claims, a positive may be considered a "negative" of a negative as well as a negative may be considered a negative of a positive.

The invention itself, as well as the principles underlying the same, will best be understood from the following detailed description thereof taken in connection with the accompanying drawings, in which:

Fig. 2 shows diagrammatically a printing system embodying our invention;

Fig. 3 is a horizontal section taken on line 3—3 of Fig. 2;

Fig. 4 shows a modified system embodying our invention;

Fig. 5 shows a simple electrical circuit for the system of Figs. 2 and 3; and

Figure 1:
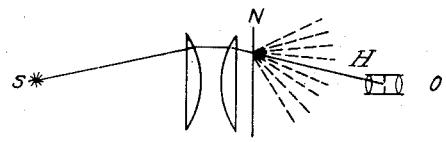
Fig. 1 is a diagram illustrating the scattering of light by negatives in projection printing.

In a paper before the Royal Photographic Society of Great Britain in 1909, Andre Callier showed how scattering of light by the negative was responsible for the difference in contrast between positives made by projection and those made by contact printing from the same negatives. He says:

"In projection there is, of course, a scattering of the light transmitted by the negative (see Fig. 1). The ray SH coming from the light source S is scattered in passing through negative N, and only a part of the light coming from the negative can enter the lens. As in the transparent parts of the negative the loss by scatter is nearly zero (owing to the relative absence of reduced silver), it follows that the contrast between the non-scattering parts of no density and the scattering parts of high density will be increased by the scatter. In contact printing this scattered light is not lost, and consequently the contrast is much less than in the case of projection."

This condition would immediately be corrected if the negative itself rather than illuminant S were to be made the source of light. This would be the case if the negative were luminous, for instance, the negative then being a light source which would radiate light from its surface in all directions with an intensity at each elemental area thereof inversely proportional to the silver deposit at the area.

This, obviously, cannot be accomplished; but, in accordance with our invention, the lighting of the negative can be modified in such a manner that the effective light which reaches the lens system and the positive will approximate that which would have reached it were the negative itself the source of light.

This end is accomplished according to the present invention by locating a source of printing light at the sides of negative and thereby illuminating the negative by indirect light—that is, by light rays which strike the negative at such an oblique angle that those rays which pass undeflected through the negative do not reach the lens, only those rays scattered by the silver grains in the direction of the lens being cast thereby and brought to a focus on the positive film.

With such indirect lighting the scattering of light from the darker portions of the negative sends almost as much light to the lens as it did with the usual direct lighting, illustrated in Fig. 1, but in the clear spaces a great deal less light is scattered and hence a great deal less light reaches the lens. Consequently there is a reduction in the contrast of the light and dark shades in the positive.

Such indirect lighting of the negative can be carried to an extent where there is an actual reversal of the usual printing process and a negative is printed from a negative. This result is realized when the lights are moved so far from a position perpendicular to the surface of the negative toward a position in the plane of the negative that the scattering by the dense portions of the negative sends more light to the lens than is scattered and sent by the clear portions of the negative. This condition is usually realized when the light is from the same side of the film as the lens, although indications of the effect can be noted as the lights are brought towards the plane of the negative from their usual perpendicular position outside thereof.

By combining such indirect lighting with the usual direct lighting any desired degree of contrast can be secured in the positive print.

In Fig. 2 is shown a projection printing system embodying our invention, this system being the present preferred form thereof. In the figure, the letter N indicates the negative film and the letter P a positive film being printed therefrom, the two films being positioned in printing relationship on opposite sides of an objective O. The broken line A—A represents the optical axis of the system, this line being perpendicular to the surfaces of the films N and P. Mounted to the left of negative N in Fig. 2 and located in the line of axis A—A is an illuminant D, a condenser C being placed between D and the printing area of negative N. Light rays emitted from illuminant D are collected by condenser C and are directed thereby through negatives N, the rays thence passing through objective O and striking directly upon positive P to print a positive of the image of negative N. A plurality of illuminants I, here shown as four in number, are uniformly spaced about the optical axis A—A and are positioned to illuminate the printing area of negative N at an oblique angle, as indicated in Figs. 2 and 3, a condenser E being mounted between each illuminant I and the negative. The illuminants I are equally spaced about the optical axis, and there are preferably four or more of them in number so that the negative will be equally illuminated from every side.

It is to be noted that light rays emanating from illuminant D strike the negative in a direction straight toward lens O and positive P, the rays not scattered in the negative being picked up and cast by objective O directly upon the positive; while light rays emanating from illuminant I strike the film at an oblique angle, a small proportion of these oblique rays being reflected or dispersed in the film toward the objective and finally striking the positive. The positive is thus seen to be illuminated directly by illuminant D, and indirectly by illuminants I.

If a positive print be made with only illuminant D lighted, the illumination will be exclusively direct—by rays passing through the negative film in a direction perpendicular to its surface and straight toward the lens O and film P—, thus making a print in the ordinary well known manner, and which will be characterized by the usual contrast or harshness of projection prints. If, on the other hand, a positive print be made with illuminants I lighted, the illumination will be exclusively indirect—by light rays passing through the film in a direction oblique to its surface, which will result, according to the principles hereinbefore set out, in a relatively flat positive—one in which there is relatively little contrast. But with both illuminants D and I lighted, a compromise between these extreme results is obtained, and the contrast of the positive print is reduced in a degree determined in accordance with the relative intensities of the two sources of illumination.

Means are then provided for varying the relative intensities of the illuminants D and I, so that the system is capable of producing a positive print of any character of contrast desired. For this purpose the illuminants may be connected in an electrical circuit as indicated in Fig. 5, in which illuminant D is connected in series with a variable resistant $R_1$ across a power supply line L, and illuminants I are connected in series with a variable resistance $R_2$ across the power supply line. By varying the resistance of $R_1$ and $R_2$, any combination of illumination desired is readily obtainable, as will be understood. It is possible, for instance, to print with the use of only illuminant D, in which case no softening effect is obtained and the usual positive of relatively great contrast is obtained. Or, the positive may be printed with the use of only illuminants I, in which case a very flat positive will be obtained. And by combining the two sources of illumination the entire range of modification between these two extremes is available.

Figure 6:
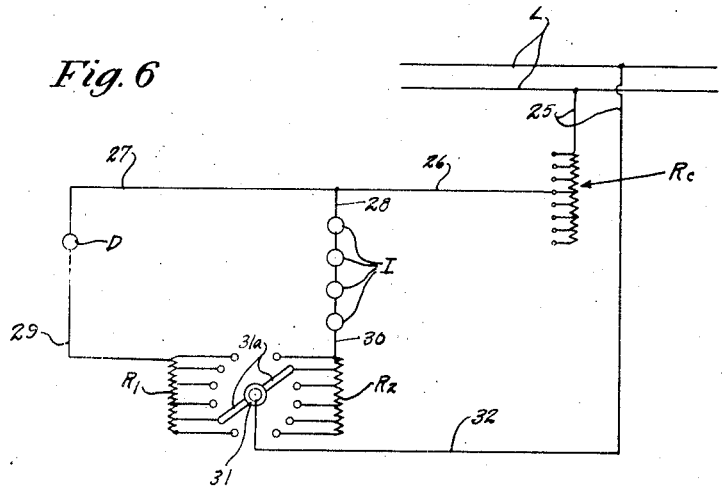
Fig. 6 shows a preferred electrical circuit embodying a unitary control for the illuminants of the system of Figs. 2 and 3.

In Fig. 6 is shown an arrangement for so interconnecting the rheostats $R_1$ and $R_2$ that the resistance of one is cut out as the resistance of the other is cut in, and vice versa. The letter L represents the power lines, as before, the feed line to the system being indicated by the numeral 25. In line 25 there is shown a variable resistance $R_c$, which represents any well known light changer, adapted to vary the total power supplies to illuminants D and I together. Wire 26, leading from $R_c$, has two branches 27 and 28, the first of which goes to illuminant D and the second of which goes to illuminants I. The other side of illuminant D is connected by wire 29 to the upper terminal of rheostat $R_1$; while the other side of illuminants I is connected by wire 30 to the upper terminal to the rheostat $R_2$. There is then provided a pair of rheostat blades 31a controlled by a single handle 31, which sweep the terminals of the rheostats, as shown. The rheostat blades 31a are connected by wire 32 to the other side of light changer $R_c$. It may now be seen that the two rheostats are arranged to be operated together, one being cut out as the other is cut in; and the result of this arrangement is obviously that the total illumination of illuminants D and I together remains a constant for any setting of $R_c$, although the relative illumination of D and I may be inversely varied within any limits. We thus have the condition that no matter what the relative positions of rheostats $R_1$ and $R_2$ may be, the total illumination incident upon the negative film is a constant—only what may be termed the effective obliquity of the "average incident illumination" being varied by changing the setting of rheostats $R_1$ and $R_2$. The "average illumination", in this sense, is the effective illumination due to the combination of the direct and indirect sources, and effectively acting from an angular position which is determined by the respective angularities and relative strengths of the two sources of illumination. Variation of $R_c$ on the other hand, changes the quantity of illumination on the negative, without changing its effective obliquity. This system thus provides a unitary control for the intensities of the two sources of illumination which is adapted to vary their individual values inversely while maintaining their joint total value a constant, and a second control for varying their joint total value while not affecting the relation between the individual values.

It may now be seen that means have been provided for varying what may be termed the effective obliquity of the "average illumination". Similar results can be obtained according to the modified system shown in Fig. 4. In this system there is provided a single set of illuminants K, which illuminants are adapted to swing in the arc C—C between the limiting positions indicated in dotted line at $u$ and $v$ respectively. The arc C—C, which may be of any suitable radius, has its center located on optical axis A—A at the printing area of negative N. Illuminants K may conveniently be mounted on suitable carriages G, which are adapted to ride in ways 20 of a track 21 conforming to arc C—C. The obliquity of the illumination is now varied merely by varying the position of the set of illuminants K. Thus with illuminants K located, for example, in the full line position of the figure, the same effect is obtained as if the film were illuminated by the combination of a set of illuminants positioned approximately at $u$, with another illuminant located on the optical axis A—A, similarly to the arrangement of Figs. 1 and 2.

It will be recognized that the illustrative system specifically described herein is capable of considerable modification and rearrangement without departing from the spirit and scope of our invention; and it is therefore to be understood that the following claims embrace all such modifications and equivalent arrangements as may fairly be construed to fall within the scope of our invention.

We claim:

1. In a system of photographic printing, means for supporting a negative and an actinic film in printing relationship, illuminating means for the negative located at right angles to the surface of said negative, another illuminating means for the negative located at oblique angles to the surface of the said negative, and unitary means for varying inversely the relative intensities of the two said illuminating means.

2. In a system of photographic printing, means for supporting a negative and an actinic film in printing relationship, illuminating means for the negative located at right angles to the surface of said negative, another illuminating means for the negative located at oblique angles to the surface of said negative, means for varying the intensity of the first mentioned illuminating means, means for varying the intensity of the last mentioned illuminating means, and unitary means for controlling inversely the two last mentioned means.

3. In a system of photographic printing, means for supporting a negative and an actinic film in printing relationship, illuminating means for the negative located at right angles to the surface of said negative, another illuminating means for the negative located at oblique angles to the surface of said negative, means for varying the intensity of the first mentioned illuminating means, means for varying the intensity of the last mentioned illuminating means, unitary means for controlling inversely the two last mentioned means, and means for controlling proportionately the intensities of the two illuminating means.

4. The method of photographic projection printing of a positive from a negative transparency, that includes placing the negative transparency and an actinic film in printing relationship on the optical axis of the projection lens, illuminating the face of the negative transparency away from the lens uniformly with direct light rays normal to the surface of the transparency, illuminating the same face of the transparency with light rays oblique to its surface, and balancing the relative intensities of the direct and oblique light rays to produce desired contrast in the print.

5. The method of photographic projection printing of a positive from a negative transparency, that includes placing the negative transparency and an actinic film in printing relationship on the optical axis of the projection lens, illuminating the face of the negative transparency away from the lens uniformly with direct light rays normal to the surface of the transparency, illuminating the same face of the transparency with light rays oblique to its surface, and adjusting the intensity of the oblique light rays relative to the normal light rays such that sufficient of the oblique rays scattered in passing through the transparency are added to the direct normal rays going to the actinic film to compensate increase in contrast due to scatter of normal rays in passing through the transparency.

6. The method of controlling the contrast of a positive during printing of the positive by projection from a negative transparency, that includes placing the transparency and an actinic film in printing relationship on the optical axis of the projection lens, and causing light to uniformly illuminate and pass through the transparency in the direction towards the lens, said light including rays oblique to the optical axis of the lens, and varying the effective obliquity of the average light passing through the transparency to control contrast in the print.

7. A photographic projection printing system, comprising a projection lens, means for supporting a negative transparency and an actinic film in printing relationship on the optical axis of said lens, illuminating means located on the side of the transparency away from the lens for causing light rays to uniformly illuminate and pass through said transparency including rays passing in a direction oblique to the optical axis of said lens, and means for varying the average obliquity of the light rays passing through the transparency.

FRANK E. GARBUTT.
GEORGE A. HATHERELL.
THOMAS M. INGMAN.